United States Patent [19]

Okamoto

[11] Patent Number: 5,333,019
[45] Date of Patent: Jul. 26, 1994

[54] METHOD OF ADJUSTING WHITE BALANCE OF CRT DISPLAY, APPARATUS FOR SAME, AND TELEVISION RECEIVER

[75] Inventor: Nobuyuki Okamoto, Tokyo, Japan

[73] Assignee: Sony Corporation, Tokyo, Japan

[21] Appl. No.: 53,228

[22] Filed: Apr. 28, 1993

[30] Foreign Application Priority Data

May 6, 1992 [JP] Japan .................................. 4-141019

[51] Int. Cl.[5] ............................................. H04N 9/64
[52] U.S. Cl. ..................................... 348/656; 348/692
[58] Field of Search ..................... 358/29, 27, 28, 34, 358/168, 169, 170, 171, 172, 173, 64, 74, 242, 243, 174; 340/744; 345/20; H04N 9/64, 9/73

[56] References Cited

U.S. PATENT DOCUMENTS

| | | | |
|---|---|---|---|
| 3,928,867 | 12/1975 | Lynch | 358/169 |
| 3,955,047 | 5/1976 | Willis | 358/173 |
| 4,044,375 | 8/1977 | Norman | 358/172 |
| 4,091,419 | 5/1978 | Rhee | 358/169 |
| 4,445,152 | 4/1984 | Karlock | 358/167 |

*Primary Examiner*—James J. Groody
*Assistant Examiner*—Sherrie Hsia
*Attorney, Agent, or Firm*—Lewis H. Eslinger; Jay H. Maioli

[57] ABSTRACT

A method and apparatus for adjustment of the white balance of a CRT display system enabling white balance adjustment to be performed in a short time and a television receiver using the same. The white balance adjustment apparatus has a level adjustment circuit, an attenuation resistor, a video signal output circuit, a coupling capacitor, and a synchronous-signal-tip level clamp circuit and is connected to the cathode electrode. The level adjustment circuit has a variable amplifier which amplifies only the video signal component V, a synchronous signal separation circuit, a variable amplifier for causing attenuation of the horizontal synchronous signal H-SYNC, a signal addition circuit, and an AND gate. In the white balance adjustment mode, the ratio of levels of the video signal and synchronous signal is changed from the usual 0.714:0.218 to, for example, 0.714:0.005. By this, even when the drive voltage is adjusted in the synchronous-signal-tip level clamp circuit after the adjustment of the background in the level adjustment circuit, there is less change of the horizontal synchronous signal and there are, therefore, less number of tracking operations needed between the adjustment of the background and the adjustment of the drive voltage.

7 Claims, 3 Drawing Sheets

METHOD OF ADJUSTING WHITE BALANCE OF CRT DISPLAY, APPARATUS FOR SAME, AND TELEVISION RECEIVER

BACKGROUND OF THE INVENTION

1. Field of the Invention

The present invention relates to the adjustment of a white balance of a CRT display system (television (TV) receiver, monitor, etc.). In particular, it relates to a method and apparatus for adjusting the white balance of a CRT display system which enables speedy simultaneous adjustment of the background and the level, of extremely high resolution (definition, density) monitors such as graphic display monitors operating at a high frequency over 100 MHz as the band of the video signal.

2. Description of the Related Art

In a color CRT display system, when monochrome image data is reproduced, the same color temperature must be ensured despite the various brightnesses of the screen. To obtain such an image, the white balance is adjusted, i.e., the drive voltage of the video signal amplifier inside the color CRT display system is adjusted.

To adjust a white balance, the light energies emitted from the three red, green, and blue color phosphors must be adjusted to a predetermined ratio. The light efficiencies of the light emitted from the currently used three color phosphors differ slightly, but the ratio of currents of the red, green, and blue electron beams for obtaining a white color is substantially the same. Therefore, it is sufficient to slightly adjust the ratio of the currents. There is some variation, however, with individual color CRT systems, so a circuit is provided for the adjustment of the white balance.

Usually, the white balance is adjusted by two types of adjustment: adjustment of the background to adjust the black levels of the individual color signals and adjustment of the drive voltage to adjust the white peak level of the video signal so that the pedestal level of the video signals (level close to substantially black) gives a completely black display.

In a color CRT display system, a video signal output amplifier provided at the last stage and the cathode electrode terminal of a high resolution monitor CRT unit in the CRT display system are connected through a coupling capacitor. In a synchronous-signal-tip level clamping (STC) video circuit, the ratio between the pedestal level of the video signal and the tip level of the synchronous signal is usually set to 0.714:0.286.

When adjusting the white balance of a CRT display system before factory shipment, if the pedestal level is adjusted for the drive Voltage, the tip level of the synchronous signal will be adjusted in addition to the level of the video signal. That is, the cathode of the CRT display system has been clamped at a tip level of the synchronous signal, so due to the adjustment of the drive voltage, the pedestal level showing the black level and adjusted by the adjustment of the background may be changed against the will of the adjuster. As a result, adjustment of the background is required once again after the adjustment of the drive voltage. It then becomes necessary to adjust the drive voltage after this adjustment of the background. This means that one must repeatedly adjust the white balance by going back and forth between adjustment of the background and adjustment of the drive voltage, and, consequently, the adjustment takes time.

SUMMARY OF THE INVENTION

An object of the present invention is to provide a method for adjusting a color CRT display system enabling adjustment of the white balance in a short time and an apparatus for adjusting the CRT display system. In particular, it has as its object the provision of a method and apparatus for adjustment of the white balance of a high resolution display monitor.

Further, another object of the present invention is to provide a television receiver having the above-mentioned white balance adjustment circuit.

Therefore, to solve the above problems and enable adjustment of the white balance in a short period of time, according to the present invention there is provided a method of adjusting the white balance of a CRT display system which enables adjustment of the background and adjustment of the drive voltage of a CRT display unit in the CRT display system to be performed substantially simultaneously, which method of adjusting the white balance of a CRT display system is characterized in that the adjustment of the background and the adjustment of the drive voltage are performed substantially simultaneously by adjusting the ratio of the level of the synchronous signal and the level of the video signal so that the level of the synchronous signal becomes smaller.

In the white balance adjustment mode, the ratio between the level of the synchronous signal and the level of the video signal is adjusted so that the level of the synchronous signal becomes smaller. As a result, even if the drive voltage is adjusted after the adjustment of the background, there is relatively little change in level of the synchronous signal, so the number of alternate repetitions of the adjustment of the background due to readjustment of the level of the synchronous signal caused by adjustment of the drive voltage and adjustment of the drive voltage after adjustment of the background becomes fewer and the time for adjustment of the white balance becomes shorter.

Further, according to the present invention, there is provided a circuit for adjusting the white balance of a CRT display system wherein a synchronous-signal-tip level clamping circuit is provided between the drive voltage adjustment circuit and the CRT display unit and the adjustment of the background and adjustment of the drive voltage are performed substantially simultaneously, which method of adjusting the white balance of the CRT display system is characterized in that the adjustment of the background and the adjustment of the drive voltage are performed by adjusting the ratio of the level of the synchronous signal and the level of the video signal so that the level of the synchronous signal becomes smaller.

Further, according to the present invention, there is provided an apparatus for adjusting the white balance of a CRT display system which has a level adjustment circuit which adjusts the ratio of the tip level of the synchronous signal and the pedestal level of the video signal in accordance with the application of an adjustment mode signal so that the relative level of the synchronous signal becomes smaller, a drive adjustment circuit which changes the amplitude of respective RGB video signals from the level adjustment circuit, a background voltage adjustment circuit which clamps the peak level of the output signal from the drive adjustment circuit at an adjusted reference level so as to adjust the background level, and signal connecting means for connecting the adjusted signal to a cathode electrode of a CRT in the CRT display system.

Preferably, there is provided a circuit for adjusting the level of the synchronous signal in accordance with the DC voltage applied to the level adjustment circuit.

More preferably, between the level adjustment circuit and the background voltage adjustment circuit, there is provided a drive voltage adjustment attenuation circuit which causes attenuation of the output voltage of the level adjustment circuit.

More preferably, the background voltage adjustment circuit and the cathode electrode of the CRT display unit are synchronous-signal-tip level clamped by a coupling capacitor.

Further, according to the present invention, there is provided a television receiver which has a white balance adjustment circuit for a color CRT unit therein, which television receiver is characterized by being provided with a circuit means for making the level of a tip of the synchronous signal included in the video signal relatively lower than the level of a video signal portion included in the video signal, a video signal output amplification stage which amplifies the signal of the output, a circuit which supplies the output of the amplification stage as a control voltage of the color CRT display unit in the CRT display system through a coupling capacitor, and a circuit which clamps to a predetermined value at the tip level of the synchronous signal of the video signal to the cathode electrode of the CRT display unit.

When installing the above white balance adjustment circuit in a television receiver, it is possible to adjust the white balance before factory shipment and when installed at the user's site, it is possible to adjust it easily and in a short time.

BRIEF DESCRIPTION OF THE DRAWINGS

The above objects and features of the present invention and other objects and features will become clearer by the following description of the embodiments, with reference to the accompanying drawings, wherein.

DESCRIPTION OF THE PREFERRED EMBODIMENTS

As an embodiment of a method for adjusting the white balance of a CRT display system and an apparatus for adjusting the white balance of a CRT display system according to the present invention, a white balance adjustment circuit in a high resolution (definition, density) monitor or a high resolution television receiver will be described.

Figure 1:
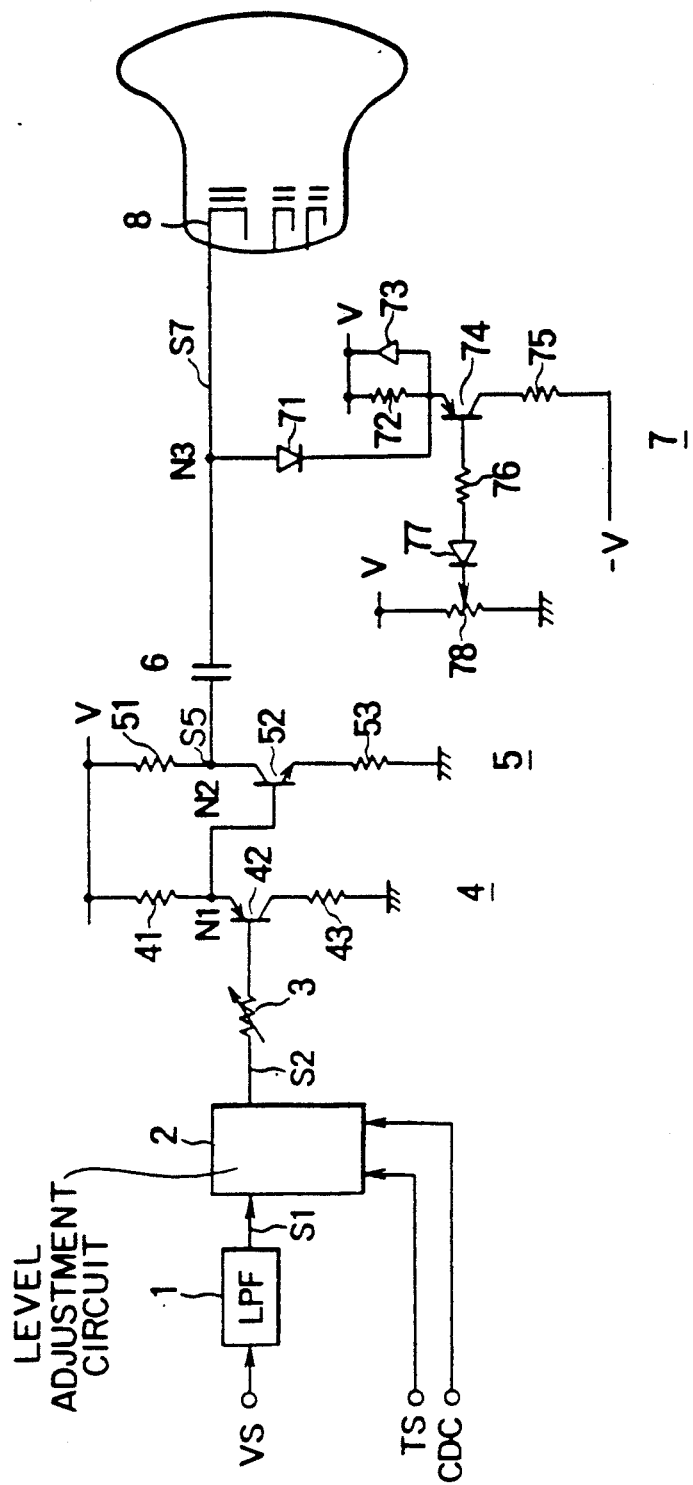
FIG. 1 is a partial circuit diagram of a white balance adjustment circuit of an embodiment of a white balance adjustment apparatus in a CRT display system of the present invention.

FIG. 1 is a circuit diagram showing a part of a white balance adjustment circuit in a color graphic display system as an example of a high resolution monitor.

The circuit shown in FIG. 1 shows the white balance adjustment circuit for a signal amplification circuit of red color signal in the color graphic display system. Similar circuits are provided for the green color signal and the blue color signal, but these have been omitted for ease of understanding of the circuit.

The white balance adjustment circuit of FIG. 1 has a low pass filter 1, a level adjustment circuit 2, an attenuation resistor 3, a buffer circuit 4, a video signal output circuit 5, a coupling capacitor 6, and a synchronous-signal tip level clamp (STC) circuit 7, and has connected to the output stage of the STC circuit 7 a red color signal cathode 8 of a CRT display unit in the graphic display system.

Figure 2:
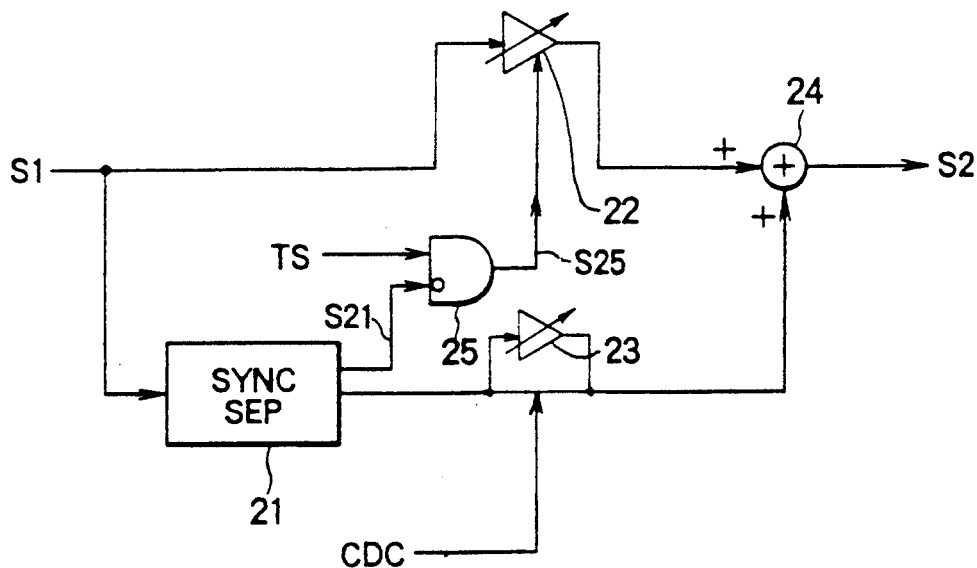
FIG. 2 is a constitutional view circuit diagram of the level adjustment circuit in FIG. 1.

FIG. 2 is a circuit diagram of the level adjustment circuit 2 of FIG. 1. The level adjustment circuit 2 is comprised of a synchronous-signal separation circuit 21, a video signal varying amplifier 22, a synchronous signal varying amplifier 23, a signal addition circuit 24, and an AND gate 25.

The buffer circuit 4 of FIG. 1 is comprised of a resistor 41, a PNP buffer transistor 42, and a resistor 43.

The video signal output circuit 5 of FIG. 1 is comprised of a resistor 51, an NPN type video signal output transistor 52, and a resistor 53.

The STC circuit 7 of FIG. 1 is comprised of a clamp diode 71, a resistor 72, a reverse-current-flow prevention diode 73, a PNP type clamp level adjustment transistor 74, a resistor 75, a resistor 76, a reverse-current-flow prevention diode 77, and a variable resistor 78.

Between the video signal output circuit 5 and the red color signal cathode 8 is provided a coupling capacitor 6. In the STC circuit 7, the level of the tip portion of the synchronous signal is clamped.

When the video signal VS is applied to the low pass filter 1, the low frequency component of the video signal VS is applied to the level adjustment circuit 2 as the signal S1.

Figure 3A:
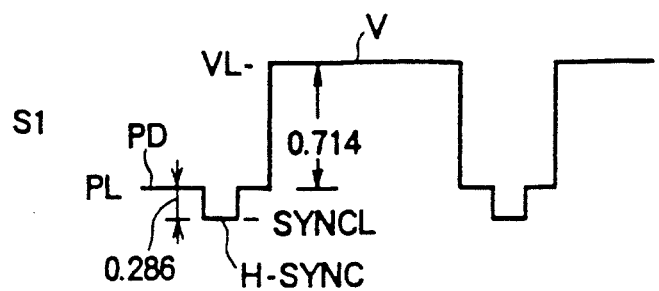
FIGS. 3a to 3d are waveform diagrams of the signals in FIG. 1.

The signal S1 from the low pass filter 1, like the original video signal VS, consists of a cyclic succession of a horizontal synchronous signal H-Synchronous, a pedestal signal PD, and a video signal component V as shown in FIG. 3a.

The horizontal synchronous-signal level SYNCL of the horizontal synchronous signal H-SYNC and the video signal level VL of the video signal component V are usually set to a ratio of 0.286:0.714 as mentioned above.

The synchronous-signal separation circuit 21 separates the horizontal synchronous signal H-SYNC from the video signal S1 passing through the low pass filter 1.

When the timing of the synchronous signal is detected by the synchronous signal separation circuit 21, the synchronous signal detection signal S21 is applied to the inverted input terminal of the AND gate 25. At the non-inverted input terminal of the AND gate 25, there is applied an adjustment signal TS set to the high level at the white balance adjustment mode. The video signal varying amplifier 22 responds to signal S25 from the AND gate 25, and amplifies only the video signal level VL portion of the video signal component V inside the video signal S1 by a predetermined gain.

The horizontal synchronous signal H-SYNC separated by the synchronous signal separation circuit 21 is attenuated by an attenuation ratio set in accordance with the voltage level of the control DC voltage CDC in the synchronous signal varying amplifier 23.

The output signal voltage of the video signal varying amplifier 22 and the output voltage signal of the synchronous signal varying amplifier 23 are added in the signal addition circuit 24 and output to the attenuation resistor 3 of FIG. 1 as the video signal S2.

Figure 3B:
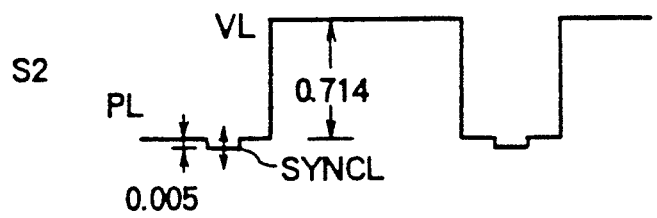

The ratio between the horizontal synchronization level SYNCL of the horizontal synchronous signal H-SYNC of the video signal S2 obtained by addition at the signal addition circuit 24 of FIG. 2 and the video signal level VL of the video signal component V is, for example, as shown in FIG. 3b, set in level to the ratio of 0.005:0.714. That is, the horizontal synchronous signal level SYNCL of the horizontal synchronous signal H-SYNC is adjusted in level to an extremely small ratio with respect to the video signal level VL of the video signal component V.

The attenuation resistor 3 is a variable resistor for drive adjustment which causes attenuation of the level of the video signal S2.

The signal attenuated at the attenuation resistor 3 is applied to the video signal output circuit 5 through the buffer circuit 4.

Figure 3C:
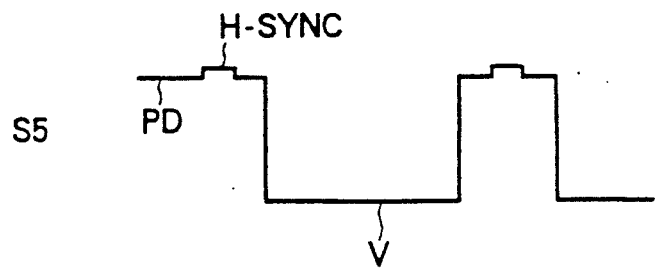

The output signal S5 from the video signal output circuit 5 is output from the node N2 connected to the collector of the video signal output transistor 52 and, as shown in FIG. 3c, is amplified by a predetermined amplification rate at the polarity applied to the red signal cathode 8.

Figure 3D:
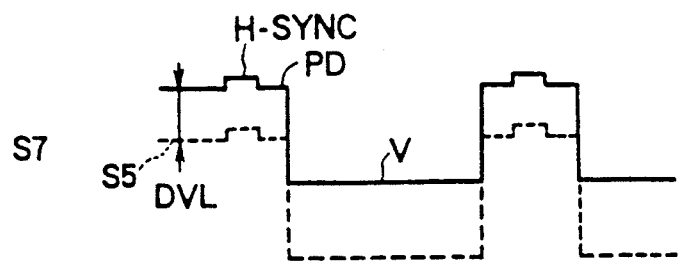

Turning to the drive voltage at the node N3, the background voltage is adjusted and the level of the tip of the synchronous signal is clamped to a predetermined value at the STC circuit 7. At this time, the drive voltage at the node N3, as shown in FIG. 3d, is shifted in level by the background adjustment voltage level DVL. Regarding this background adjustment voltage level DVL, the value of the variable resistor 78 is adjusted so that the video signal level VL of the pedestal signal PD of the signal S5 accurately gives a black color in the graphic display system.

The background voltage adjustment signal S7 at the node N3, adjusted as to the background voltage in this way, is applied to the red color signal cathode 8.

In the background voltage adjustment signal S7 shown in FIG. 3d, the ratio of the horizontal synchronous signal level SYNCL of the horizontal synchronous signal H-SYNC adjusted in the level adjustment circuit 2 and the video signal level VL of the video signal component V are maintained. In other words, the horizontal synchronous signal level SYNCL is adjusted to form an extremely small ratio with respect to the video signal level VL. Therefore, even if the drive voltage is adjusted in the attenuation resistor 3, since the level adjustment of the horizontal synchronous signal level SYNCL is substantially the same level as for the pedestal level PL, there is no major change of the horizontal synchronous signal level SYNCL due to the adjustment of the drive voltage as in the past. That is, the dependency on the adjustment of the drive voltage is very small, so the results of the adjustment of the background voltage are not changed to a great extent due to the adjustment of the drive voltage.

As a result, the number of tracking operations between the adjustment of the background and the adjustment of the drive voltage becomes much less and the adjustment of the white balance is completed in a short time.

The reduction of the number of tracking operations means a reduction in the cost of the adjustment and in turn a reduction in the price of the high resolution monitor and television receiver.

The attenuation rate of the synchronous signal varying amplifier 23 in the level adjustment circuit 2 depends on the level of the control DC voltage CDC applied thereto. Therefore, in the synchronous signal varying amplifier 23, the horizontal synchronous signal level SYNCL of the horizontal synchronous signal H-SYNC may be made substantially the same level as the pedestal level PL of the pedestal signal PD. Alternatively, the ratio with the video signal level VL of the video signal component V need not be the above-mentioned 0.005:0.714, but may be made any ratio, for example, 0.01:0.714.

This level adjustment ratio may be freely set by setting the level of the control DC voltage CDC in accordance with the characteristics of the high resolution monitor.

Further, when in addition to the above-mentioned white balance adjustment, the user desires brightness adjustment, it is possible for the user to adjust to any brightness by adjusting the level of the control DC voltage CDC.

The above-mentioned embodiment illustrated a color graphic display system as a preferable embodiment of a color CRT display system, but the present invention may be applied to other high resolution monitors other than a color graphic display system or a high resolution television receiver etc., of course, and also may be applied to the adjustment of the white balance for an ordinary CRT display system.

Further, as a circuit for adjustment of the white balance of the above-mentioned high resolution monitor, an example was given of the case where a coupling capacitor 6 is provided between the red color signal cathode 8 and the video signal output circuit 5 and the synchronous-signal-tip level clamping is performed in the STC circuit 7. However, the method of adjusting the white balance of a CRT display system, the apparatus for adjusting the white balance of a CRT display system, and the television receiver of the present invention may also be applied to the case where the above synchronous-signal-tip level clamping is not performed.

As explained above, according to the method of adjusting the white balance of a CRT display system, the apparatus for adjusting the white balance of a CRT display system, and the television receiver of the present invention, the adjustment of the background and the adjustment of the drive voltage may be performed substantially simultaneously in a short time.

Further, according to the method of adjusting the white balance of a CRT display system, the apparatus for adjusting the white balance of a CRT display system, and the television receiver of the present invention, the power consumption is lower and the generation of heat by the CRT display system and the television receiver can be held to a minimum.

What is claimed is:

1. A method of adjusting a white balance of a CRT display system which enables an adjustment of a background and an adjustment of a drive voltage of a CRT display unit in the CRT display system to be performed substantially simultaneously, comprising:
    adjusting a ratio of a level of a synchronous signal and a level of a video signal so that the level of the synchronous signal is minimized in order to optimize the background; and
    adjusting the drive voltage while keeping the ratio of the level of the synchronous signal and the level of the video signal substantially constant in order to optimize the drive voltage.

2. A method of adjusting a white balance of a CRT display system wherein a synchronous-signal-tip level clamp circuit is provided between a drive voltage adjustment circuit and a CRT display unit in the CRT display system, and an adjustment of a background and an adjustment of a drive voltage are performed substantially simultaneously, comprising: adjusting a ratio of a level of a synchronous signal and a level of a video signal so that the level of the synchronous signal is minimized in order to optimize the background; and adjusting the drive voltage while keeping the ratio of the level of the synchronous signal and the level of the video signal substantially constant in order to optimize the drive voltage.

3. An apparatus for adjusting a white balance of a CRT display system, comprising:

level adjustment means receiving a color video signal for adjusting a ratio of a tip level of a synchronous signal and a pedestal level of the video signal in accordance with the application of an adjustment mode signal so that the level of the synchronous signal is minimized and outputting a R, G or B color video signal;

drive adjustment means for changing an amplitude of the respective R, G or B color video signal from the level adjustment means;

background voltage adjustment means connected to the drive adjustment means, for clamping the ratio of the tip level of the synchronous signal and the pedestal level of the video signal at an adjusted reference level; and signal connecting means for connecting an adjusted signal from the background voltage adjustment means to a cathode electrode of a CRT in the CRT display system.

4. An apparatus for adjusting a white balance of a CRT display system according to claim 3, wherein the level of adjustment means comprises a means for adjusting the level of the synchronous signal in accordance with a DC voltage applied to the level adjustment means.

5. An apparatus for adjusting a white balance of a CRT display system according to claim 4, further comprising a drive voltage adjustment attenuation means for causing attenuation of the output voltage of the level adjustment means between the level adjustment means and the drive adjustment means.

6. An apparatus for adjusting a white balance of a CRT display system according to claim 5, wherein the background voltage adjustment means and the cathode electrode of a CRT display unit in the CRT display system are coupled by a coupling capacitor.

7. A television receiver which has a white balance adjustment circuit for a color CRT display system comprising:

first circuit means for minimizing a ratio of a level of a synchronous tip of a synchronizing portion of an input video signal and a level of a video portion of the input video signal;

second circuit means for varying a magnitude of a signal output from the first circuit means;

signal output amplification means for amplifying a signal output from the second circuit means;

third circuit means for supplying an output of the amplification means as a control voltage of a color CRT display unit of the display system through a coupling capacitor;

fourth circuit means connected to the signal output amplification means through the coupling capacitor for clamping to a predetermined value the ratio of the level of the synchronous tip and the video portion and for outputting the clamped ratio to a cathode electrode of the CRT display unit.

* * * * *